S. M. HOUCK.
CORN HARVESTER.
APPLICATION FILED DEC. 6, 1905. RENEWED JULY 17, 1909.

949,983.

Patented Feb. 22, 1910.
7 SHEETS—SHEET 2.

FIG. 2.

WITNESSES:
William F. Bauer.
Irvine Miller.

INVENTOR.
Samuel M. Houck.
BY
ATTORNEY.

S. M. HOUCK.
CORN HARVESTER.
APPLICATION FILED DEC. 6, 1905. RENEWED JULY 17, 1909.
949,983.
Patented Feb. 22, 1910.
7 SHEETS—SHEET 3.
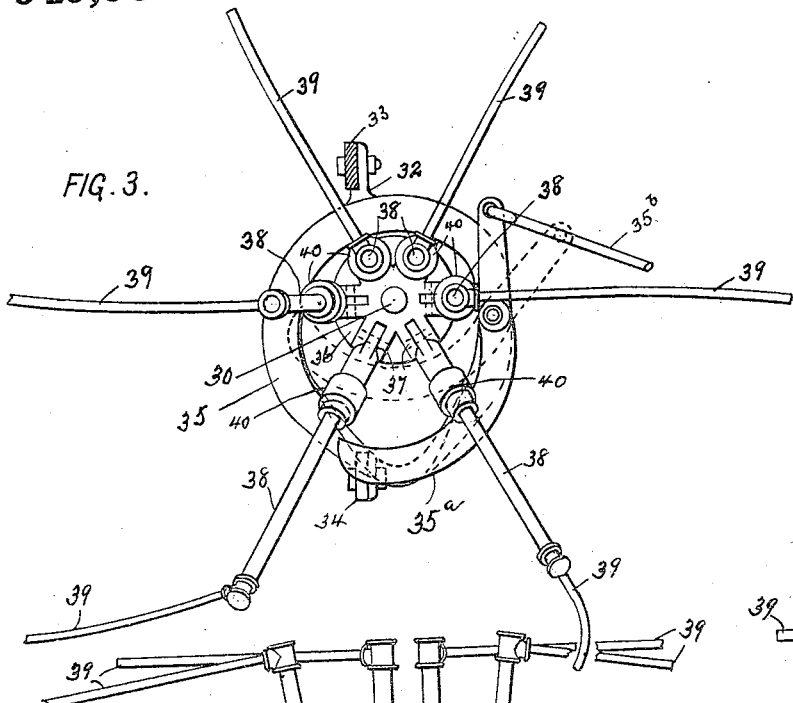
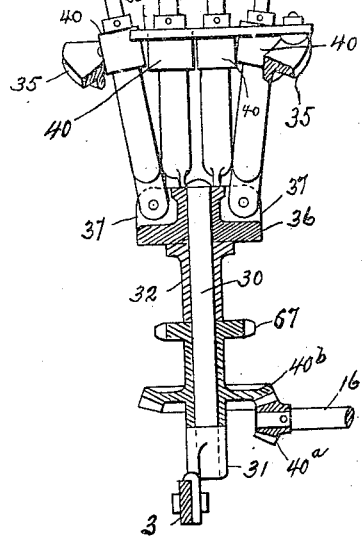
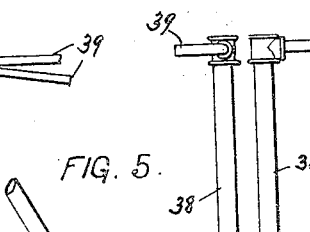
WITNESSES.
William F Bauer.
Irvine Miller.
INVENTOR.
Samuel M. Houck.
BY H. A. Toulmin.
ATTORNEY.
ANDREW B. GRAHAM CO., PHOTO-LITHOGRAPHERS, WASHINGTON, D. C.

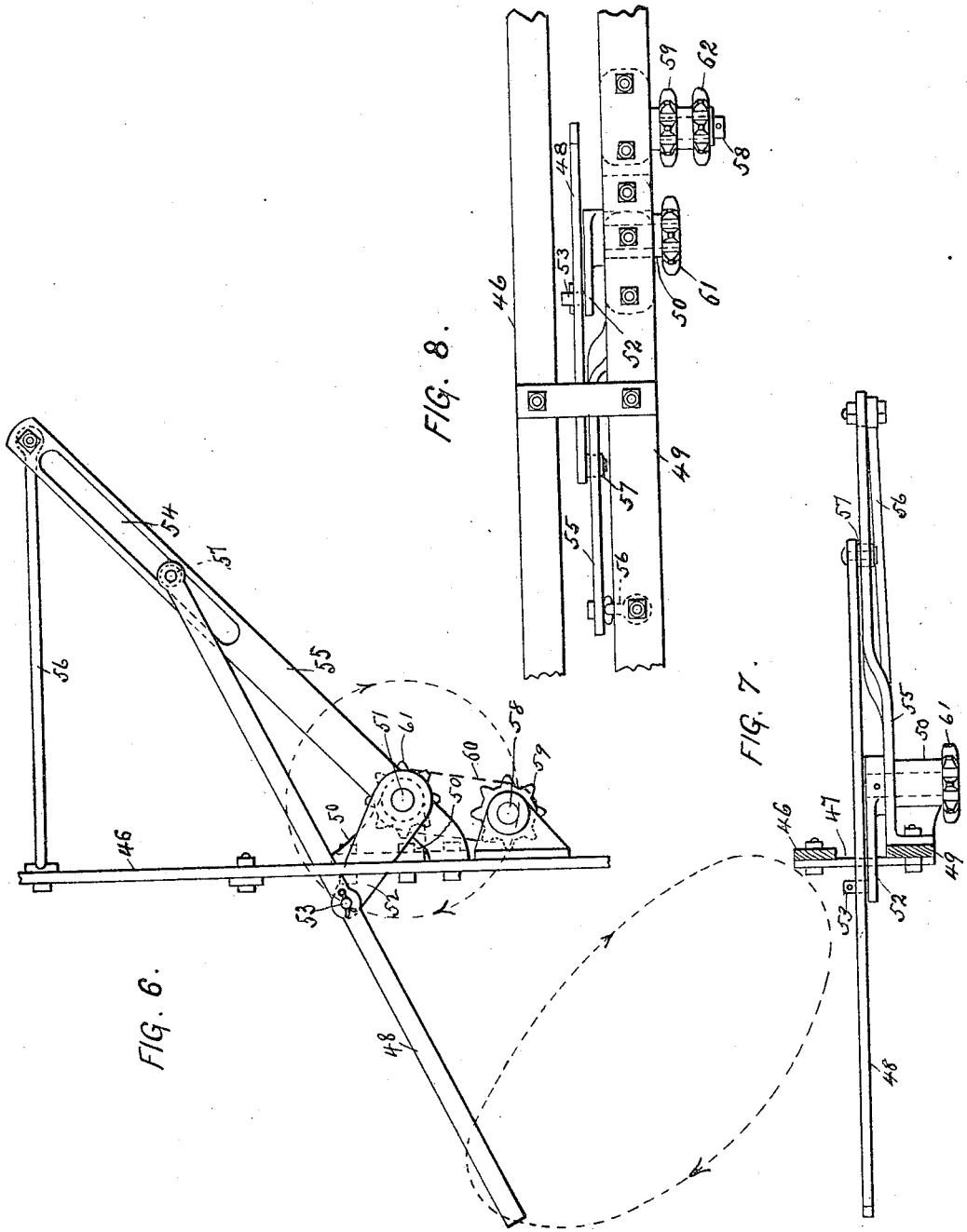

S. M. HOUCK.
CORN HARVESTER.
APPLICATION FILED DEC. 6, 1905. RENEWED JULY 17, 1909.

949,983.

Patented Feb. 22, 1910.
7 SHEETS—SHEET 5.

WITNESSES.
William F. Bauer
Irene Miller.

INVENTOR.
Samuel M. Houck.
BY
ATTORNEY.

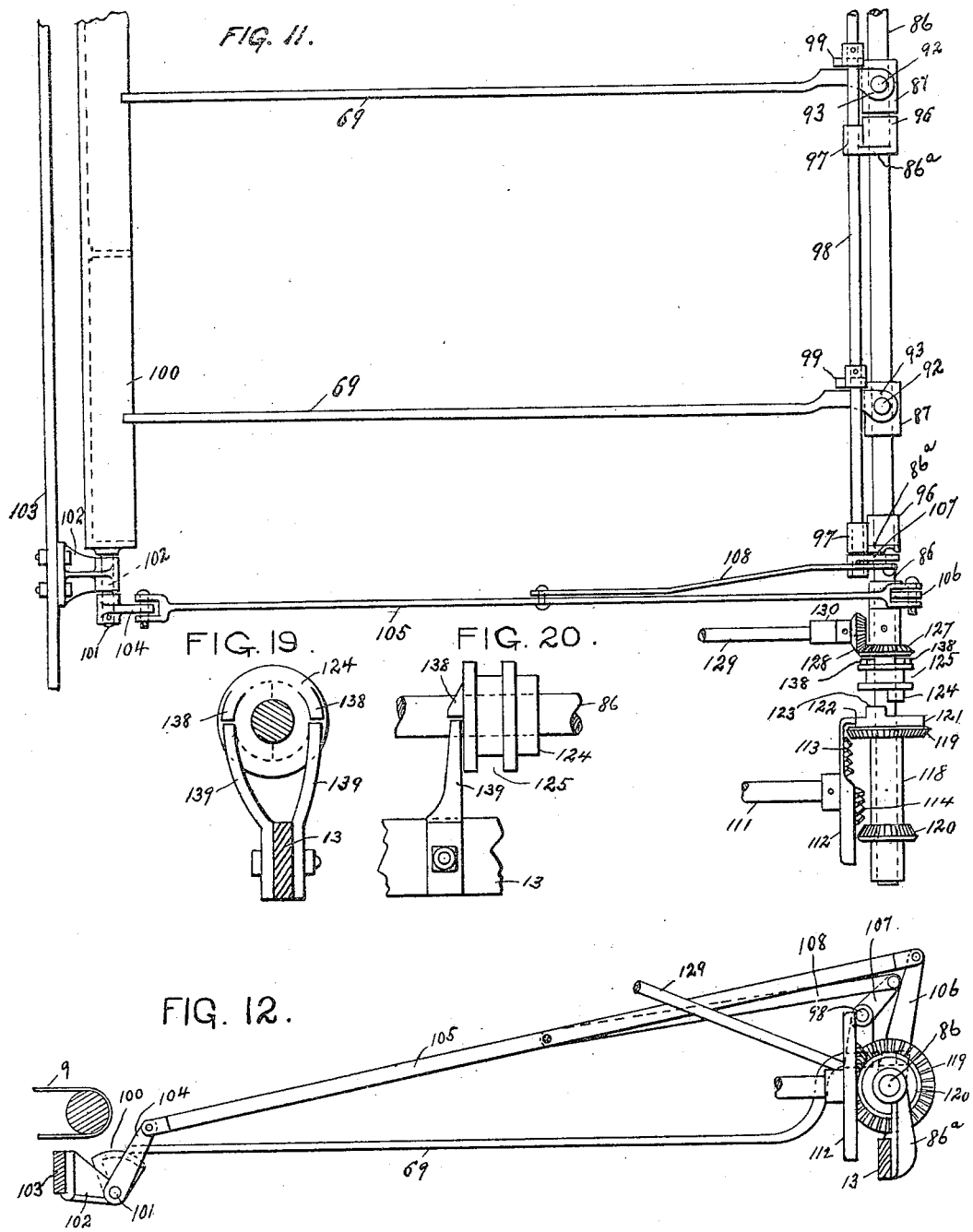

S. M. HOUCK.
CORN HARVESTER.
APPLICATION FILED DEC. 6, 1905. RENEWED JULY 17, 1909.
949,983.
Patented Feb. 22, 1910.
7 SHEETS—SHEET 7.
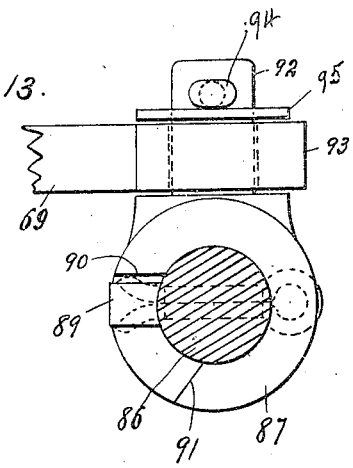
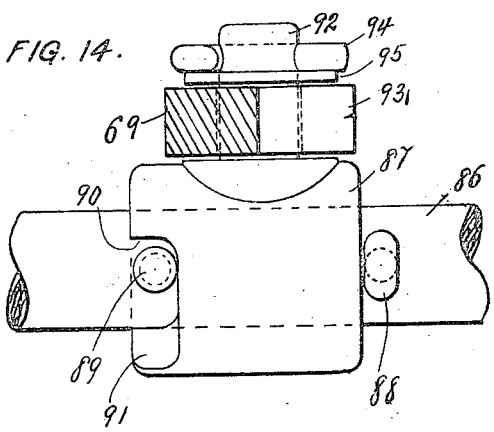
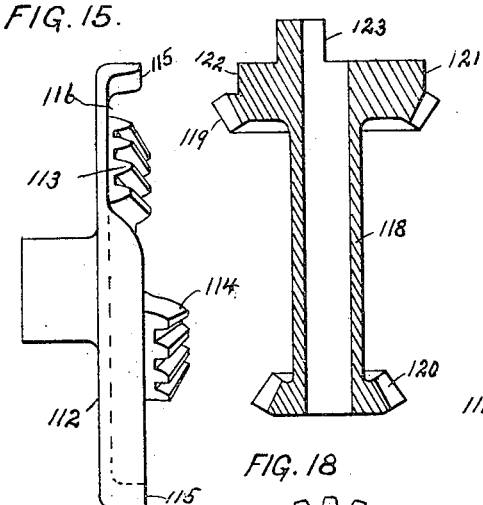
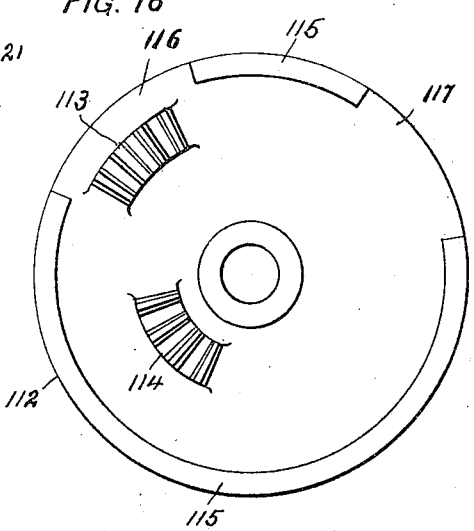
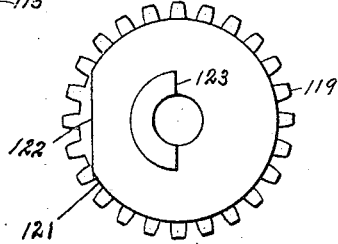
WITNESSES.
William F. Bauer.
Irvine Miller.
INVENTOR.
Samuel M. Houck.
BY H. A. Toulmin,
ATTORNEY.

UNITED STATES PATENT OFFICE.

SAMUEL M. HOUCK, OF SPRINGFIELD, OHIO.

CORN-HARVESTER.

949,983. Specification of Letters Patent. Patented Feb. 22, 1910.

Application filed December 6, 1905, Serial No. 290,539. Renewed July 17, 1909. Serial No. 508,145.

*To all whom it may concern:*

Be it known that I, SAMUEL M. HOUCK, a citizen of the United States, residing at Springfield, in the county of Clark and State of Ohio, have invented certain new and useful Improvements in Corn-Harvesters, of which the following is a specification, reference being had thereto to the accompanying drawings.

This invention relates to corn harvesters, and has for its object to provide a machine for harvesting corn and the like, which will sever the standing stalks, bringing them into upright position if down, and will deliver them upon the ground at intervals, as desired, in groups or gavels containing any desired number of stalks, all uniformly arranged so as to be ready to be set up and ready to be bound in shocks.

To this end my invention consists in certain novel features which I will now proceed to describe, and will then particularly point out in the claims.

Figure 1:
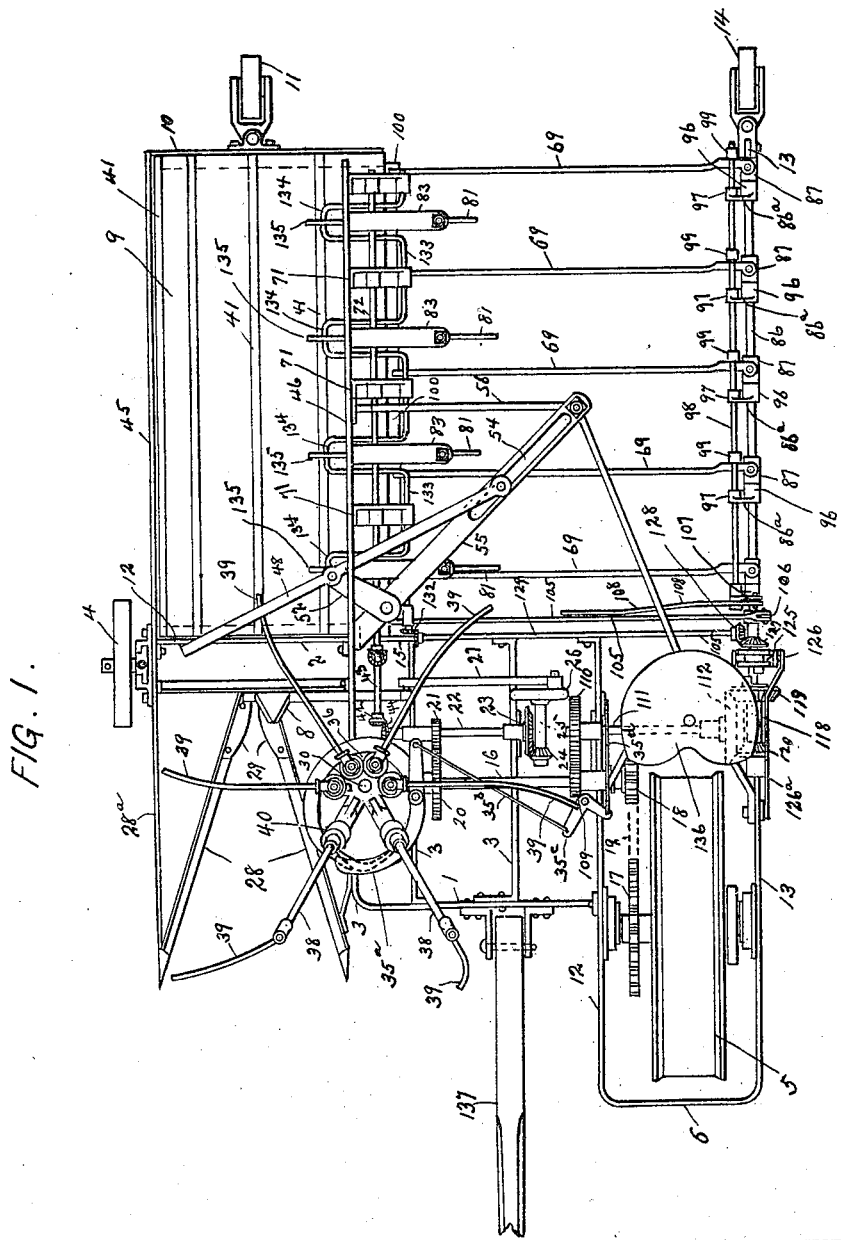
Figure 9:
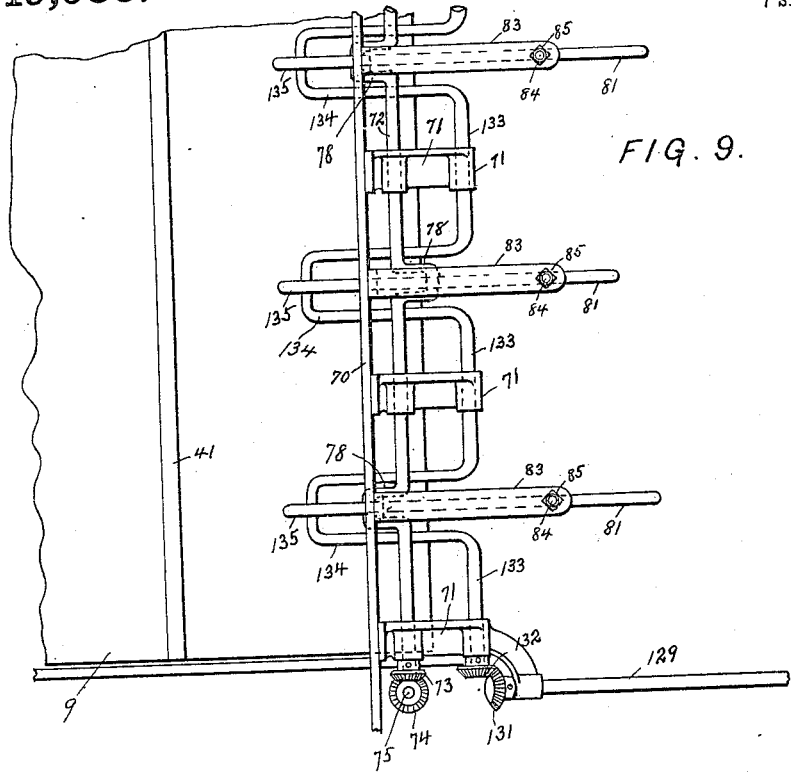
Figure 10:
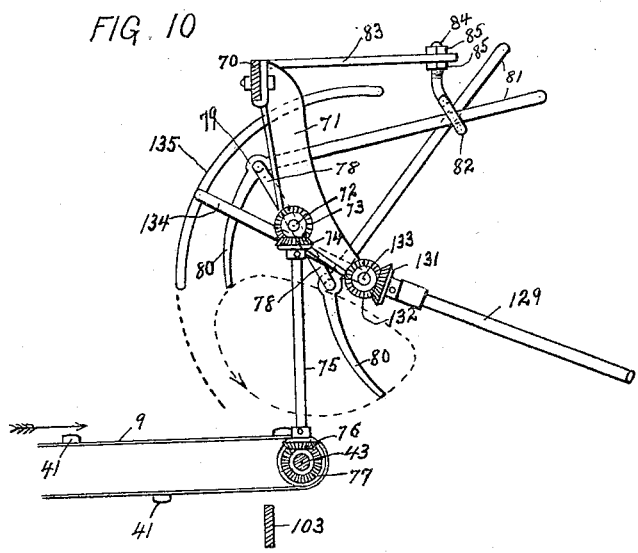

In the accompanying drawings, Figure 1 is a plan view of a machine embodying my invention in one form; Fig. 2 is a side elevation of the same; Fig. 3 a plan view of the reel; Fig. 4 is a front elevation of the same, partly in section; Fig. 5 is a side elevation of the same; Fig. 6 is a plan view of the sweep; Fig. 7 is a front elevation of the same; Fig. 8 is a side elevation of the same; Fig. 9 is a plan view of the mechanism for transferring the stalks from the apron to the dropper, together with the cut-off mechanism; Fig. 10 is a front elevation of the same; Fig. 11 is a plan view of the dropper; Fig. 12 is a front elevation of the same; Fig. 13 is a detail view, in front elevation, showing the pivotal connections of one of the dropper arms; Fig. 14 is a side elevation of what is shown in Fig. 13; Fig. 15 is an edge view of the reversing driving gear; Fig. 16 is a face view of the same; Fig. 17 is a sectional view of the double gear coöperating with said driving gear; Fig. 18 is a rear end view of the same; and Figs. 19 and 20 are detail views illustrating the stop or detent for holding the finger-controlling shaft stationary when not in operation.

In the said drawings, I have shown the mechanism as supported upon a frame substantially such as is set forth in my allowed application, filed June 7, 1902, Ser. No. 110,564. The main or axle portion of the frame comprises a forward transverse portion 1, a rear transverse portion 2, parallel therewith, and an intermediate longitudinal connecting portion 3, all of which parts may be built up of plates or bars in the manner shown. The grain wheel 4 is adjustably mounted at the outer end of the part 2, and the main or driving wheel 5 is mounted at the outer end of the part 1, being supported in a frame 6, and may be vertically adjusted relatively to it by means of the well known rack and pinion adjustment, indicated at 7 in Fig. 2. The cutter 8 lies in front of the part 2, and a transversely moving conveyer or apron 9 lies back of the part 2, so that the driving wheel lies in front of the cutter and of the mechanism for handling the cut stalks. The conveyer is carried by a frame 10, supported at its front end from the part 2, and at its rear end by means of a swiveling caster wheel 11, as in my said prior application. The supporting frame 6 for the main wheel 5 has parallel longitudinal members 12 and 13, the latter of which extends to the rear as far as does the supporting frame 10, and is supported at its rear end by a similar swiveling caster wheel 14. A cross bar 15 extends from the part 2 and supporting frame 10 to the longitudinal frame member 13, and has the rear end of the longitudinal frame member 12 secured to it.

16 represents a main shaft mounted transversely on the frame of the machine and driven from the main wheel 5 in any suitable manner, as, for instance, by sprocket wheels 17 and 18 on the main wheel axle and main shaft respectively, and a sprocket chain 19 connecting said wheels. On the shaft 16 there is mounted a gear 20, which meshes with a pinion 21 on a countershaft 22, supported parallel therewith on the main frame. This countershaft is provided at one of its ends with a bevel gear 23, with which meshes a bevel pinion 24 on a crank shaft 25, supported on the main frame and having a crank wheel 26, which, by a pitman 27, drives the cutter 8. This cutter may be of any approved construction. With it coöperate fixed or stationary gathering arms 28, converging rearwardly, and braces 28$^a$ inclined upwardly and rearwardly, as shown in Figs. 1 and 2, to guide the stalks into proper position relatively to the cutter, at the same time aiding in lifting them if the stalks are down. These arms are provided with converging blades 29 which coöperate with the cutter in severing the stalks.

In conjunction with the cutting mechanism I employ a reel, the location of which relatively to the other mechanism is shown in Figs. 1 and 2, while the details of its construction are more particularly illustrated in Figs. 3, 4 and 5. It comprises an upright shaft 30, mounted in bearings 31 and 32, the former of which is supported on one of the longitudinal members of the part 3 of the frame, while the latter is supported on an upright 33 arising from said longitudinal member 3. Said upright 33 and a similar upright 34 support between them a cam track 35, the forward portion of which is downwardly inclined, as shown. The reel shaft 30 has at its upper end a head 36, provided with a plurality of pairs of lugs 37, and between each pair of lugs there is pivoted at its lower end a reel arm 38, which carries at its upper or free end one or more fingers 39, at right angles thereto. Each reel arm is provided with a roller 40, which travels against the cam track 35, and this latter is eccentric with relation to the reel shaft, its depressed front portion being farthest from said shaft, so that as each reel arm approaches the front, it swings downward and forward so as to bring its finger under any stalks which may be down, and as the said reel arm moves rearward again, its finger carries the upper portion of the stalk rearward, thereby straightening up the stalks and presenting them in proper position for cutting. The path of the reel fingers extends somewhat to the rear of the cutter, so that they have a tendency to cause the severed stalks to fall with their tops to the rear. The reel shaft is driven from the main shaft 16 by a bevel pinion 40$^a$ on the main shaft, meshing with a bevel gear 40$^b$ on the reel shaft. The cam track 35 is provided with a switch cam 35$^a$ pivoted thereon, which, by means of a connecting rod 35$^b$, bell crank 35$^c$, and hand lever 35$^d$, may be moved into a position such as to maintain the reel arms in a vertical position and prevent their swinging down to pick up the stalks, in case the corn is standing properly, so that no necessity exists of lifting the stalks.

The severed stalks are discharged upon the conveyer 9, which is preferably an endless canvas apron moving horizontally transversely of the machine and provided with suitable battens or lifts 41. This conveyer is driven in any suitable manner, as, for instance, by means of a bevel gear 42, mounted on the extended forward end of a shaft 43, on which one of the driving rollers of the conveyer is mounted, said bevel gear meshing with a similar gear 44 on the countershaft 22. Longitudinally extending guards 45 and 46 are arranged on each side of the conveyer 9, to prevent the stalks from falling on either side of the conveyer. The inner guard, 46, is open or slotted, as indicated at 47, to permit the passage of the reel fingers after they have become disengaged from the stalks.

In order to insure the proper delivery of the stalks upon the conveyer with their tops to the rear, and at the same time to strip the stalks from the reel fingers and prevent their being carried laterally by said fingers and crushed against the inner guard 46, I employ an oscillating sweep arm 48, shown in its general relations in Figs. 1 and 2, and illustrated in detail in Figs. 6, 7 and 8.

49 indicates an elevated longitudinal bar which forms the support for and a part of the inner guard 46. To this bar is secured a bearing bracket 50, in which is mounted a vertical shaft 51, having at its upper end a crank arm 52, terminating in a crank pin 53, on which the sweep arm 48 is pivotally mounted between its ends. The forward end of the sweep arm is free, but its rear end is guided in a slot or way 54, formed in a guide arm 55, secured at its forward end to the bracket casting 50, and supported in a diagonal position by a brace rod 56, connecting its rear end to the bar 49. The sweep arm is preferably provided with an antifriction roller 57 to travel in the slot 54. Rotation of the shaft 51 causes the front or free end of the sweep arm to travel in the substantially elliptical path shown in dotted lines in Fig. 6, and this movement of the sweep arm causes it to be first projected in front of the corn which lies between said arm and the cutter, from which position it moves rearward in engagement with the tops of the stalks, carrying said tops to the rear after the stalk is severed and at the same time disengaging the stalks from the reel fingers, which are thus freed from the stalks and permitted to move onward without throwing them off of the conveyer laterally or crushing them against the inner guard. The final operation of the rearward movement of the sweep arm deposits the stalks on the conveyer with their tops to the rear, longitudinally of the machine and transversely with respect to the direction of travel of the conveyer. The sweep arm then moves forward to repeat this operation, at the same time withdrawing from the path of the stalks until it has reached its initial position and is ready to again be projected to engage the stalks and carry them rearward.

The shaft 51 may be driven in any suitable manner, and, in the present instance, I have shown it as driven from a short vertical countershaft 58, having a sprocket wheel 59, around which passes a sprocket chain 60, which also passes around a sprocket wheel 61 on the shaft 51. A second sprocket wheel 62 on the shaft 58 is driven by means of a sprocket chain 63 from a sprocket wheel 64 on the upper end of a vertical shaft 65. This latter shaft has at its lower end a sprocket wheel 66, while the reel shaft 30 is provided with a sprocket wheel 67, and a sprocket chain 68 passes around the two sprocket wheels, so that the shaft 65 receives its rotary motion from the reel shaft, and the movements of the sweep are properly timed with relation to the movements of the reel arms.

The gavel supporting and dropping fingers 69 to be hereinafter more specifically referred to lie side by side with the conveyer 9, being located at the discharge end of said conveyer and extending in the direction of travel thereof when in their receiving position. These fingers occupy substantially all of the width of the machine at the rear thereof which is not occupied by the conveyer 9, and I have provided means for transferring the stalks from the conveyer to the fingers and distributing the stalks over these latter. The mechanism by which these results are accomplished is shown more particularly in Figs. 9 and 10 of the drawings. In this construction, 70 indicates a bar located below and parallel with the bar 49, said bar 70 carrying a series of supporting brackets 71, in which is journaled a shaft 72, to which rotary motion may be imparted from any suitable source. In the present instance, I have shown this shaft as driven by means of a bevel gear 73 on its front end, meshing with a bevel gear 74 on the upper end of a shaft 75, the lower end of which is provided with a bevel gear 76, meshing with a similar gear 77 on the shaft 43. The shaft 72 is provided at suitable intervals with crank bends 78, extending therefrom alternately in opposite directions, and on each of these cranks there is journaled a transferring and distributing arm 79, having a lower working portion 80, adapted to engage the stalks on the discharge end of the conveyer and toss the same over onto the gavel supporting and dropping fingers 69. Each arm 79 has a shank or stem portion 81, which extends through a guide 82, supported by an arm 83 projecting from the bar 70. The shanks of the arms are free to reciprocate and rock in their guides, and give to the arms a path such as is indicated in dotted lines in Fig. 10. The guides are vertically adjustable with respect to their supporting arms, having threaded shanks 84, which pass through the corresponding supporting arms 83, and are held and adjusted relatively to said supporting bar by nuts 85, mounted on their threaded portion. Owing to the alternately reverse arrangement of the cranks 78, the transferring arms operate in two sets, one of which is sweeping the stalks from the conveyer onto the gavel fingers, while the other set is returning after discharging its stalks.

The gavel supporting and dropping fingers 69 are supported from the rearward extension of the bar 13 through the medium of a shaft 86, supported from the bar 13 by means of brackets 86$^a$. The connection between each finger 69 and the shaft 86 is shown in detail in Figs. 13 and 14 of the drawings. This connection comprises a sleeve 87, loosely mounted on the shaft 86 and prevented from moving longitudinally thereon by means of pins 88 and 89, projecting from the shaft. The sleeve 87 is provided with shoulders or projections 90 and 91, lying in the path of the pin 89, and these shoulders or projections may be readily formed by providing a recess or notch in the adjacent end of the sleeve, as shown. The sleeve 87 has an upwardly extending journal pin or pivot 92, and the finger 69 terminates in a hub or collar 93, held in position on the pivot stud 92 by means of a split pin 94 and washer 95, or in any other suitable manner. Thus the supporting fingers 69 are free to move to a limited extent around the horizontal axis of the shaft 86, so as to cause them to be raised or lowered from the ground, and are also free to move around the substantially vertical pivots 92, so as to permit them to assume a position at right angles to the line of draft and also a position substantially parallel with the line of draft. The brackets 86$^a$ are provided not only with bearings 96 for the shaft 86, but they also carry bearings 97, in which is mounted a rock shaft 98, provided with projections 99 extending downwardly therefrom and located one in the rear of each finger 69. The normal position of the fingers 69 is a substantially horizontal one transversely to the line of draft, with their free ends immediately adjacent to and level with or somewhat below the discharge end of the conveyer 9. In this position, they are supported by a support 100, mounted on a rock shaft 101, supported in bearing brackets 102 from a longitudinally extending bar 103, forming part of the conveyer frame 10. The rock shaft 101 is provided at its forward end with an arm 104, which is connected by a rod 105 with an arm 106, secured on the shaft 86. The rock shaft 98 is provided at its forward end with an arm 107, which is connected by a rod 108 with the rod 105. By means of a suitable clutch-controlled mechanism, an oscillating movement may be imparted to the shaft 86, so as to cause it to rotate first in one direction and then in the reverse direction. This mechanism I will now proceed to describe.

On the main shaft 16 there is secured a pinion 109, which meshes with a gear 110 on a countershaft 111, provided at its end with a gear 112, which is shown in detail in Figs. 15 and 16 of the drawings. Said gear is provided with a bevel gear segment 113, of relatively large radius, and a bevel gear segment 114, of relatively small radius, while the peripheral portion of the gear is formed into an annular flat delay surface 115, cut away at 116, adjacent to the gear segment 113, and at 117, opposite the gear segment 114. 118 represents a sleeve mounted loosely on the shaft 86 opposite the end of the shaft 111 and provided at one end with a bevel gear or gear segment 119, adapted to mesh with the gear segment 113, and at its other end, on the opposite side of the axial line of the shaft 111, with a bevel gear or gear segment 120, adapted to mesh with the gear segment 114. The gear 119 is provided with a collar 121, having a flattened delay surface 122, adapted to travel on the flattened delay surface 115 of the gear 112. The gear 119 also carries a clutch member 123, adapted to be engaged by a corresponding clutch member 124, splined on the shaft 86 so as to move longitudinally thereon and rotate in unison therewith. This clutch member 124 has the usual grooved collar 125, to receive a fork 126, operated by suitable intermediate mechanism 126ª from the driver's position.

It will be seen that the shaft 111 will impart a rotatory reciprocating motion to the sleeve 118, first in one direction and then in the opposite direction. When the shaft 86 is connected to said sleeve by means of the clutch provided for that purpose, said shaft 86 will oscillate, or rotate in one direction and then in the other direction. The first effect of this engagement of the clutch is to cause the arm 106, through the rod 105 and arm 104, to so turn the rock shaft 101 as to move the supports 100 out from under the free ends of the fingers 69. At the same time, the arms 99 will move laterally upward and outward out of the way of the fingers 69, and the pins 89 will move downward away from the shoulders 90 of the sleeves which support the fingers 69. This will permit the free ends of the fingers to drop down upon the ground, and at the same time said fingers will be free to swing around the pivots 92 so as to move into a position practically parallel with the line of draft. By reason of this operation, the stalks which have been accumulating upon the fingers 69 will be deposited upon the ground in the form of a gavel or unbound shock, the stalks lying parallel with each other and with their heads all pointing to the rear in the same direction. The interval between the two movements of the shaft 86, produced by the delay surface 115, will permit the fingers to draw clear of the stalks, the shaft 86 then rotates in the reverse direction, and the pins 89 engage with the shoulders 90, and so turn the sleeves 87 as to move the fingers upward to their original level. At the same time, the connection between the arms 106 and 104 by the rod 105 causes the rock shaft 101 to move the support 100 back into a position ready to receive the free ends of the fingers. By reason of the connection of the rod 108 to the rod 105, the arm 107 is so turned as to operate the rock shaft 98, and bring the arms 99 to bear upon the backs of the fingers 69, swinging these latter into proper transverse position, so that they will again rest upon the supports 100 at their free ends. The clutch is then disconnected, and the parts remain in position to receive another load of stalks.

The machine is so organized as to avoid the necessity of the stoppage thereof during the operation of dropping the gavel, so that the machine may operate continuously in cutting the standing corn. Since this mode of operation results in a continuous delivery of the severed stalks onto the conveyer 9, I provide mechanism for cutting off the supply of stalks from the discharge end of said conveyer during the period when the gavel supporting fingers are not in receiving position. In order that this cut-off mechanism may be timed to operate in proper relation with the dropping fingers, I prefer to drive it from the shaft 86 which operates said fingers. To this end, said shaft is provided with a bevel gear 127, with which meshes a bevel gear 128 on one end of a shaft 129, extending in an inclined position across the front end of the space occupied by the fingers. This shaft is supported at its lower end in a suitable bearing bracket 130 on the frame member 13, said bracket having bearings for the shafts 86 and 129. At its other end it is supported in a bearing from one of the brackets 71, and is provided with a bevel gear 131, meshing with a bevel gear 132 on the forward end of a shaft 133, mounted in suitable bearings in the brackets 71. The shaft 133 has a plurality of U-shaped bends or crank arms 134, corresponding in number and location with the arms 79, each of which latter works within the space between the parallel arms of the corresponding crank arm 134. Each crank arm 134 is provided at its extremity with a cut-off arm 135, lying in front of the corresponding transferring arm 79. The parts are so timed that when the shaft 86 turns in one direction to cause or permit the gavel supporting fingers to drop their load, the cut-offs 135 are swung down as indicated in dotted lines in Fig. 10, so as to stand in front of the transferring arms and between them and the stalks on the conveyer 9, holding these latter back and preventing their discharge from the conveyer either by the transferring arms or by the action of the conveyer itself. When the shaft 86 rotates in the opposite direction, bringing the gavel supporting arms back into receiving position, the shaft 133 is also rotated in the reverse direction, and the cut-offs are swung up into inoperative position, permitting the stalks to again be delivered from the conveyer by the transferring arms to the supporting fingers.

In order to hold the shaft 86 against movement when not in operation, I provide a detent or stop mechanism, illustrated more particularly in Figs. 19 and 20 of the drawing. The clutch member 124 is provided on its rear face with stop lugs 138, and the frame member 13 carries stop projections 139, which lie in the path of the stop projections 138 when the clutch member 124 is shifted out of engagement with the clutch member 123. Thus, when the clutch member 124 is moved forward to connect the shaft 86 to its driving mechanism, said shaft is free to rotate, and when said clutch member is moved rearward to disconnect said shaft from its driving mechanism, said shaft is held against accidental rotation.

The location of the driver's seat is indicated at 136, while the tongue to which the draft animals are connected is shown at 137, the same being pivotally connected to the front of the transverse frame member or axle member 1.

The detailed description of the mode of operation of the several mechanisms heretofore given will cause the general operation of the machine to be readily understood. As the machine advances continuously along a row of corn, the standing stalks are gathered in between the gathering arms 28, and the reel arms swing successively downward and inward so as to get their fingers under any stalks which may be down, moving them upward and rearward so as to carry the stalks to and past the cutter, by which they are severed when in an upright position. By means of the gathering arms 28 and the reel fingers, all of the stalks which may be "down," or inclined to the vertical, no matter what their direction or angle of inclination may be, will be straightened up and delivered to the cutter in a practically vertical position. The sweep then takes the stalks from the reel fingers and lays them uniformly upon the conveyer with their tops to the rear, this latter carrying them transversely to the transferring and distributing fingers, by means of which they are transferred to and distributed on the gavel supporting and dropping fingers. When a quantity of stalks sufficient to form a shock of the desired size has accumulated on said fingers, the operator engages the clutch members 124 and 123, whereupon the supporting fingers are released and dropped to the ground, depositing the stalks on the ground in parallelism with each other and with their tops pointing in a uniform direction, ready to be formed into a shock. As the motion of the machine is not stopped during the dropping operation, the fingers swing freely to the rear into the line of draft, so as to be readily withdrawn from the stalks without disturbing these latter, and in the meantime, the cut-off mechanism holds back the stalks on the conveyer until the reverse rotation of the shaft 86 restores the gavel fingers to receiving position and moves the cut-offs out of the path of the stalks, whereupon the operation proceeds as before.

It will be observed that the machine is continuous in its operation and practically automatic, the only thing required of the operator beyond the management of his team being the operating of the clutch, 123, 124, at the proper times. It will also be seen that the machine is so organized as to handle the corn whether the stand be in good condition or whether the corn be largely down or partly so. The machine is rendered very compact by the arrangement of the driving wheel in front of the line of cut, so that the conveyer and supporting fingers may be located immediately back of the line of cut, while the driving wheel lies inward of the lateral plane which bounds the supporting fingers on that side of the machine, thus materially decreasing the width of the machine, while the side draft is reduced to a minimum.

I do not wish to be understood as limiting myself to the precise details of construction hereinbefore described and shown in the accompanying drawings, as it is obvious that these details may be modified without departing from the principle of my invention. For instance, the machine as shown is organized to operate upon corn by following up the direction of the rows of corn, cutting and handling one row at a time. It is sometimes necessary or desirable to operate transversely of these rows, and in such a case the cutter will be correspondingly lengthened, and the gathering arms 28 will be dispensed with.

Having thus fully described my invention, what I claim as new and desire to secure by Letters Patent is:—

1. A corn harvester comprising in combination a frame having driving and supporting wheels, a cutter, a conveyer moving transversely of the machine back of the cutter, and gavel supporting and dropping fingers located at the discharge end of the conveyer, means for pivotally supporting said fingers at the ends farthest from said conveyer, means for loosely supporting the same at the ends adjacent to said conveyer, and mechanism connected to both of said supporting means for actuating the same, substantially as described.

2. A corn harvester comprising in combination a frame having driving and supporting wheels, a cutter, a conveyer moving transversely of the machine back of the cutter, and gavel supporting and dropping fingers located at the discharge end of the conveyer to receive the stalks therefrom, said fingers, being pivotally supported on said frame at their outer ends and loosely supported thereon at their inner ends, and when in receiving position, extending transversely of the machine and being free to swing, when released, downward and rearward into a discharging position substantially in the line of draft, substantially as described.

3. In a corn harvester, the combination, with means for cutting and conveying the stalks, of gavel supporting and dropping fingers to receive the stalks, said fingers being pivotally supported at their outer ends, and extending transversely of the machine in their receiving position, means at the inner ends of said fingers for supporting the same in said receiving position, means for releasing said fingers, said fingers being free to swing downward and rearward into a discharging position, substantially in the line of draft when released, and means for restoring said fingers to their receiving position, substantially as described.

4. In a corn harvester, the combination, with means for cutting and conveying the stalks, of gavel supporting and dropping fingers to receive the stalks, said fingers extending transversely of the machine in their receiving position, means for supporting said fingers in said receiving position, means for releasing said fingers, said fingers being free to swing downward and rearward into a discharging position substantially in the line of draft when released, and means for restoring said fingers to their receiving position, said supporting, releasing and restoring means being positively actuated from a driven part of said machine, and their periods of operation being controlled by the operator, substantially as described.

5. A corn harvester comprising in combination a frame having driving and supporting wheels, a cutter, a conveyer moving transversely of the machine back of the cutter, gavel supporting and dropping fingers located at the discharge end of the conveyer, and transferring and distributing arms operating above the conveyer at its discharge end to transfer the stalks from the conveyer to the gavel supporting and dropping fingers and distribute them thereon, substantially as described.

6. A corn harvester comprising in combination a frame having driving and supporting wheels, a cutter, a conveyer moving transversely of the machine back of the cutter, gavel supporting and dropping fingers located at the discharge end of said conveyer, means for actuating said fingers to drop the gavel, a shaft supported in a plane above said conveyer and said fingers and extending transversely thereof, a cut-off carried by said shaft and adapted to engage the stalks on said conveyer from above, and means actuated by said finger-operating means for positively operating said shaft for moving said cut-off into the path of the stalks of said conveyer.

7. A corn harvester comprising in combination a frame having driving and supporting wheels, a cutter, a conveyer moving transversely of the machine back of the cutter, gavel supporting and dropping fingers located at the discharge end of the conveyer, transferring and distributing arms operating above the discharge end of the conveyer to transfer the stalks to the fingers and distribute them thereon, means for actuating said fingers at suitable intervals to drop the gavel, and a cut-off actuated in unison with said finger-actuating means and operating above the conveyer in front of the transferring and distributing arms to hold the stalks on the conveyer until the fingers are restored to receiving position, substantially as described.

8. A corn harvester comprising in combination a frame having driving and supporting wheels, a cutter, a conveyer moving transversely of the machine back of the cutter, gavel supporting and dropping fingers located at the discharge end of the conveyer, a shaft driven from the conveyer, transferring and distributing arms actuated by said shaft, a second shaft parallel with said last mentioned shaft and provided with cut-off arms, and a controlling shaft for actuating the fingers to cause them to drop the gavel and return to receiving position, said cut-off shaft being actuated from said finger-actuating shaft, substantially as described.

9. In a corn harvester, the combination, with a conveyer and gavel supporting and dropping fingers adjacent thereto, of two parallel shafts located above the discharge end of the conveyer, one of said shafts being provided at intervals with crank bends having transferring and distributing arms pivoted thereon and suitably guided to sweep over the discharge end of the conveyer, the other one of said shafts being provided with corresponding crank bends inclosing those of the first shaft and carrying cut-off arms in front of the transferring arms thereof, and means for actuating said shafts, substantially as described.

10. A corn harvester comprising in combination a frame having driving and supporting wheels, a cutter, a conveyer moving transversely of the machine back of the cutter, guards extending longitudinally of the machine and transversely of said conveyer, the inner guard having slots or openings for the passage of the reel fingers and sweep, a vertical-axis reel operating in front of the cutter to bring the stalks thereto in an upright position, and a sweep comprising a vertical shaft having a crank arm, and a sweep arm pivoted between its ends on said crank arm and having a friction roller at its rear end, a bar secured to said frame at an angle to said sweep arm, said bar having a guide slot therein adapted to receive said friction roller, the forward end of said sweep arm moving in a substantially elliptical path of which the major axis is diagonal with respect to the conveyer, whereby said sweep arm is first projected from the inner guard, and then moved rearwardly and outwardly toward the outer guard, substantially as described.

In testimony whereof, I affix my signature in presence of two witnesses.

SAMUEL M. HOUCK.

Witnesses:
E. O. HAGAN,
IRVINE MILLER.